Dec. 11, 1928.  1,694,911
J. A. DIENNER
METHOD OF AND MEANS FOR FEEDING FUEL BY WASTE HEAT
Filed Oct. 31, 1921  4 Sheets-Sheet 1

Inventor
John A. Dienner
By Brown, Boettcher & Hanes
Attorneys

Dec. 11, 1928.

J. A. DIENNER 1,694,911

METHOD OF AND MEANS FOR FEEDING FUEL BY WASTE HEAT

Filed Oct. 31, 1921

Inventor
John A. Dienner
By Brown, Bortteus Dienner
Attorneys

Dec. 11, 1928.

J. A. DIENNER 1,694,911

METHOD OF AND MEANS FOR FEEDING FUEL BY WASTE HEAT

Filed Oct. 31, 1921  4 Sheets-Sheet 3

Inventor
John A. Dienner
By Brown Bortlett Dienner
Attorneys

Dec. 11, 1928.

J. A. DIENNER

1,694,911

METHOD OF AND MEANS FOR FEEDING FUEL BY WASTE HEAT

Filed Oct. 31, 1921     4 Sheets-Sheet 4

Inventor
John A. Dienner
By Brown Boettcher Dienner
Attorneys

Patented Dec. 11, 1928.

1,694,911

UNITED STATES PATENT OFFICE.

JOHN A. DIENNER, OF CHICAGO, ILLINOIS, ASSIGNOR TO STROMBERG MOTOR DEVICES COMPANY, OF CHICAGO, ILLINOIS, A CORPORATION OF ILLINOIS.

METHOD OF AND MEANS FOR FEEDING FUEL BY WASTE HEAT.

Application filed October 31, 1921. Serial No. 511,877.

The present invention relates to a method of and means for feeding fuel by waste heat. The invention pertains to a fuel feeding system having particular application to vehicles driven by internal combustion engines, although it will be obvious that its utility is not specifically limited thereto; as for example, it may be employed on a steam propelled vehicle for feeding fuel to the burner, as by using the stack gases or the exhaust steam as the source of waste heat.

The fundamental object of the invention is to provide an improved method of feeding fuel by converting the waste heat of exhaust into a pumping energy effective to raise the fuel to the normally higher level of the carburetor float chamber. This system avoids the inherent limitations of design and location of tank characteristic of gravity feed systems, obviates the necessity of the pressure tight tank required in pressure feed systems, and avoids the irregularity of operation and the disturbance of the mixture proportions incident to the vacuum feed system. The use of the waste heat of exhaust for developing the fuel feeding energy is of course preferable, although it will be obvious that any other source of heat may be employed, such as an electrical heating coil or the heat absorbed by the cooling system.

Another object of the invention is to utilize this same principle to heat the fuel for increasing its volatility. According to this method small volumes of the fuel are intermittently vaporized and the vapor pressures which are created are utilized to set up a circulation to bring successive volumes of fuel into the vaporizing chamber. The carburetor is fed this heated fuel as it is ejected from the vaporizing chamber and such fuel as is not taken into the float chamber is used for setting up the aforesaid circulation.

This employment of waste heat for performing the work of pumping fuel is carried on at an advantage to the efficiency of the engine or other energy developing or fuel burning device to which it is applied, due to the fact that the rejected or waste heat of the engine or like device, is transformed into useful work according to a regular thermodynamic cycle working between two temperatures. Now, it is well known law that in any thermodynamic transformation the heat which is rejected at the lower or terminal temperature is no longer useful in that cycle to perform mechanical work or produce dynamic energy. According to my invention, I absorb the terminal or rejected heat in the liquid fuel pumping device by taking the said heat into the liquid itself which is being pumped, and I employ the heat for a highly useful purpose later, namely, to assist in breaking up the liquid fuel, that is, vaporizing or atomizing and vaporizing the fuel at the nozzle of the carburetor or other device for mixing the fuel with air to produce a combustible mixture. That is to say, in pumping the liquid fuel I confine a small charge of the same in a chamber and then add heat from the exhaust of the engine or similar source of heat, to bring a portion of said charge of liquid to the temperature of vaporization. Then further heat to vaporize a portion of the liquid is supplied, and to cause mechanical expansion of said vapor. Now the heat which the vapor contains, and is known in thermodynamics as the heat of vaporization, must be rejected, and I do this by condensing said vapor either by an unheated portion of the same charge of liquid, or by introducing another charge, or both, so that all of said rejected heat of vaporization is now absorbed by the liquid being pumped and this is then useful in the carburetor, or other form of mixing device, for securing a more thorough and efficient mixture.

Thus it will be seen that the heat taken from the exhaust of the engine or other fuel burning device, is employed in performing useful mechanism work in a thermodynamic engine employing the fuel as a working fluid or medium in which the rejected heat is absorbed by the fuel and performs useful work in assisting and mixing the fuel with air. It is well known that heat added to the fuel, when the latter is a fluid, is highly advantageous in securing better and more efficient combustion, because it permits the molecules or particles of fuel to move more freely and disperse better throughout the charge.

I believe that I am the first to provide means of such character for performing the mechanical work of pumping the fuel and of employing the rejected heat of the pumping device in assisting the mixture of the fuel with air and assisting thereby in more efficient and economical combustion.

Other objects concerned with the manner of controlling the application of heat to the fuel, with the manner of dissipating the fuel vapor in the pumping chamber, and with the various structural features, will appear more fully in the following detail description taken in connection with the accompanying drawing, in which;

Figure 1:
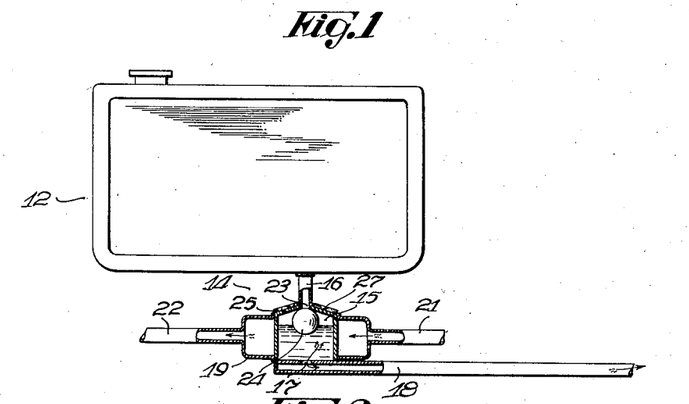
Figure 1 is a diagrammatic view of my improved fuel feed system, the pumping chamber being illustrated in section;.

In Figure 1 the fuel supply tank is represented at 12 and the fuel pumping chamber at 14. This pumping mechanism comprises a closed chamber 15 having intake communication from the tank 12 through an inlet pipe 16, and having outlet communication to the point of consumption through a port 17 and pipe 18 leading therefrom. The chamber 15 is encircled around its sides by a heating jacket 19 which receives heat from the exhaust gases, exhaust steam or the like through an intake pipe 21 and an outlet pipe 22. In the adaptation of the system to the conventional automobile, the entire volume of exhaust gases may be circulated through the jacket 19, or only a portion thereof may be shunted through the jacket in accordance with the volume of heat required to perform the pumping function. The lower end of the fuel intake pipe 16 forms an intake port 23 which is adapted to be controlled by a ball float 24. A simple expedient for guiding the ball float 24 is to flare the lower end of the intake pipe 16 outwardly as indicated at 25 to form a guiding skirt for guiding the ball up to the port 23. A check valve is preferably interposed in the discharge line 18 where there is any possibility of a counter flow back into the pumping chamber. The pumping mechanism 14 may be installed in immediate proximity to the supply tank 12 and have the exhaust gases led back to the same, or it may be installed at a forward point on the chassis if desired.

In operation, the chamber 15 fills with fuel until the rising level seats the valve 24 and prevents further ingress of fuel. The waste heat of the exhaust gases quickly brings the charge of fuel in the chamber 15 to a vaporizing temperature, whereupon vapors collect in the upper part of the chamber. The vaporization of the more volatile constituents of the fuel insures the generation of a considerable volume of vapor without heating the fuel unduly. The vapors trapped in the upper part of the chamber 15 soon generate sufficient pressure to force the fuel to the carbureter, burner, or other point of consumption by expelling the charge of fuel downwardly through the port 17 and pipe 18. With the lowering of the fuel level, a greater area of chamber is exposed to the vapors, with the result that the expansion is comparatively rapid. The fuel level recedes until the float 24 falls away from the port 23. Where the required pumping pressure is comparatively low, this will occur directly with the lowering of the level. Where the pumping pressure is comparatively high it is possible that the pressure will maintain the float valve on the port 23 for a brief period after the fuel level has fallen below the float, but it will be noted that the decrease in pressure in the vapor resulting from the complete expulsion of the fuel from the chamber will allow the float to drop and permit a fresh charge of fuel to enter. Simultaneously with the opening of the port 23 the accumulation of vapor is vented up through the pipe 16 into the tank 12, where it condenses and rejoins the main volume of fuel. The relatively cool charge of entering fuel condenses a part of the vapors remaining in the pumping chamber. With the admission of this fresh charge the float 24 again seats on the port 23 and the foregoing cycle is repeated. A covering 27 of the heat insulating material is placed over the top of the pumping chamber 15 to reduce heat losses therefrom and insure rapid expansion of the vapors. The heating of the fuel occurring in the chamber 15 is beneficial for securing or producing a more combustible mixture, this being particularly true when using the fuels of lower volatility, such as kerosene, distillate, etc.

Figure 2:
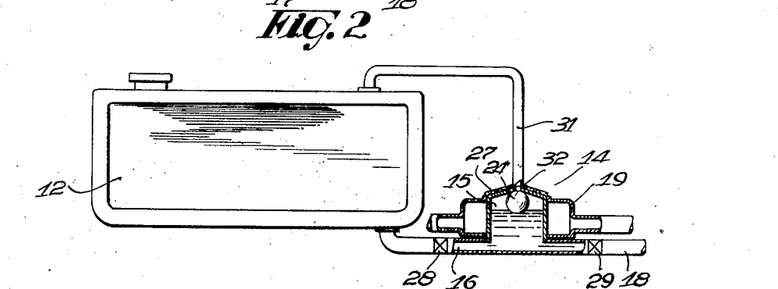
Fig. 2 is a similar view of a modified construction embodying a separate valve for venting the fuel vapors from the pumping chamber.
Figure 3:
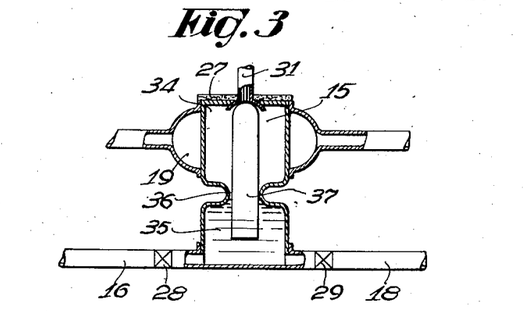
Fig. 3 is a sectional view of a modified construction also employing a separate venting valve.

In Fig. 2 I have shown an embodiment employing a separate valve to vent the fuel vapors back into the main supply tank 12 after the pumping stroke has been completed. In this form the pumping chamber 15 has its inlet pipe 16 entering the bottom of the chamber from the lower part of the main supply tank 12. A check valve 28 is interposed in this intake pipe. The outlet pipe 18 leads from the lower part of the pumping chamber 15 and has a check 29 interposed therein. The heating jacket 19 is preferably confined to the upper part of the pumping chamber 15. Extending outwardly from the top of the pumping chamber 15 is a vent pipe 31 which preferably extends over and opens into the top of the main supply tank 12. This vent pipe may open directly to atmosphere, although the former arrangement is preferable inasmuch as it results in a saving of fuel resulting from the condensation of the fuel vapors in the supply tank 12. The lower end of the pipe 31 has a guiding skirt 32 similar to the skirt 25 for guiding the ball float 24' up into the pipe opening. In this embodiment when the expanding vapors in the upper part of the pumping chamber 15 expel the fuel therefrom, the float 24' falls as before described, and allows the gases to be vented back into the supply tank 12 through the pipe 31. This momentarily equalizes the pressure in the pumping chamber 15 and the supply tank 12, whereupon, fuel enters the pumping chamber 15 through the intake pipe 16 under the head maintained by the higher level in the tank 12. It will be noted that the lower strata of fuel in the pumping chamber below the level of the jacket 19 are not subjected directly to the jacket heat. This has a tendency to reduce the heating of the fuel supplied to the carbureter. The construction illustrated in Fig. 3 is designed to this same end of reducing the heating of the fuel. In this form, the pumping chamber 15 comprises an upper heated portion 34 and a lower non-heated liquid containing portion 35 joined by a contracted portion 36. The relatively long float 37 is guided in the contracted neck 36. The heating jacket 19 encircles only the upper portion 34. The inlet and outlet pipes 16 and 18 for the fuel communicate with the lower part of the fuel containing portion 35 and have their usual check valves 28 and 29. The vent pipe 31 is adapted to be closed by the float 37 when the fuel level is in the vicinity of the contracted portion 36. This only exposes the fuel vapors, air or other gases trapped in the upper portion 34 to the heat of the jacket 19. The expansion of these gases operates to expel the fuel from the lower chamber 35 without undue heating of the fuel, the lowering of the fuel level upon such expulsion dropping the float 37 and allowing such expanded gases to be vented through the vent pipe 31, as previously described. The fresh charge of fuel entering the pumping chamber has a tendency to reduce the temperature of the gases in the chamber portion 34 between successive expansions. An alternative arrangement designed to heat only a small quantity of the fuel is secured by adjusting the float 37 to raise the fuel level to the lower part of the jacket 19. This permits the generation of vapors from the upper strata of fuel without unduly heating the main volume of fuel in the lower chamber portion 35.

Figure 4:
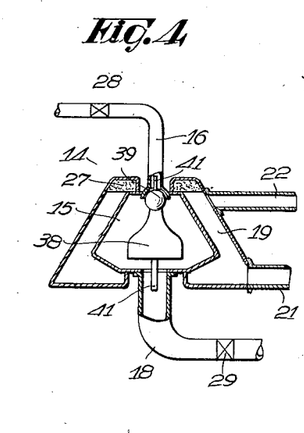
Fig. 4 illustrates in section another form of pumping chamber.

In the form shown in Fig. 4 the float is arranged to control directly the ingress of fuel to the pumping chamber 15, and this pumping chamber is designed to heat the fuel to a relatively high temperature. This high heating of the fuel is frequently of advantage when burning kerosene, distillates or the like, as is well known. The pumping chamber 15 and the float 38 are designed to induce a circulation of the fuel in the chamber and to cause the discharge of relatively hot fuel through the outlet pipe 18. The upper end of the float 38 carries a ball valve 39 for controlling the inflow of fuel through the pipe 16, this float and valve being guided by pins 41. The heating jacket 19 is designed to embrace substantially the entire pumping chamber 15. The entering exhaust gases impinging upon the lower conical portion of the pumping chamber and circulating upwardly about the upper conical portion. The circulation induced in the pumping chamber brings all portions of the fuel charge into contact with the heated wall of the chamber.

The carbureter or other point of fuel consumption may have an overflow pipe leading back to the fuel tank or to the inlet side of the pumping chamber to take care of the excess fuel from the pumping mechanism. Another embodiment of this would be to provide a supplementary chamber which would receive fuel direct from the pumping mechanism. This supplementary chamber could have an overflow back to the supply tank, or could have a float controlling; (1) the pumping action of the pumping mechanism, or (2) the circulation of the fuel through a by-pass or the like, or (3) the application of heat to the pumping mechanism.

Figure 5:
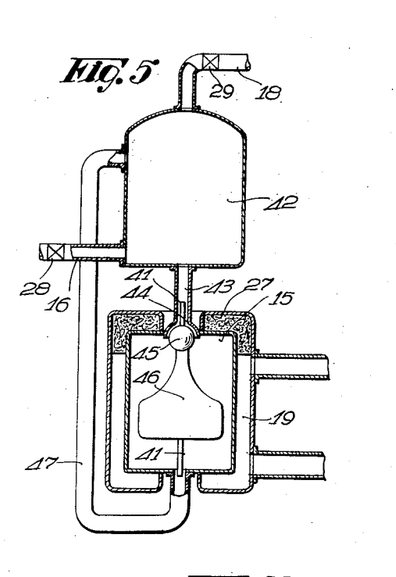
Figs. 5 and 6 illustrate other forms embodying a supplemental fuel chamber.
Figure 6:
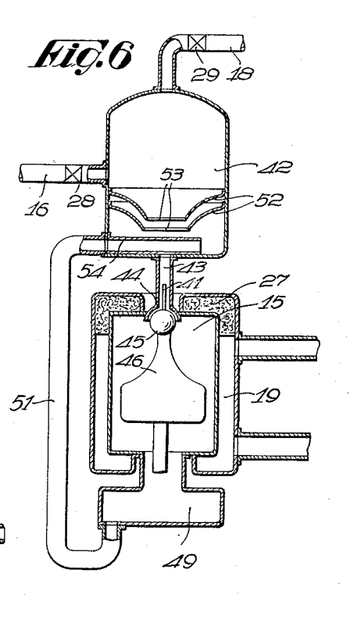

In Figs. 5 and 6 a supplemental chamber 42 is associated with the pumping chamber 15. The provision of this supplemental chamber enables a higher suction to be obtained during the instroke of the pumping mechanism, whereby the pumping mechanism may be installed at a higher level than the supply tank and still raise the fuel as in the ordinary vacuum feed system. The fuel intake from the pipe 16 is into the lower part of the supplemental chamber 42. From the chamber 42 the fuel feeds downwardly into the pumping chamber 15 through a pipe 43, the port 44 of which is controlled by a ball valve 45 on the upper end of the float 46. The fuel is expelled from the pumping chamber 15 through a pipe 47 which communicates with the bottom of the chamber and which extends up and opens into the supplemental chamber 42 at a point above the level of the intake pipe 16. The pumping chamber has the usual arrangement of heating jacket 19 and heat insulating material 27 across the top of the chamber. The outlet to the carbureter occurs from the top of the supplemental chamber 42 through an outlet pipe 18 having the usual check valve 29 therein. In the operation of this form, the discharge of the fuel into the supplemental chamber 42 through the pipe 47 displaces the fuel and any vapor or air in the upper part of the chamber 42 out through the outlet pipe 18. By reason of the fact that the pipe 47 opens into the supplemental chamber at a relatively high point, the hot fuel entering the supplemental chamber does not mingle to any great extent with the relatively cool lower strata of fuel which has just entered through the intake pipe 16. This increases the efficiency of the unit. The vapors which are vented up through the pipe 43 upon the opening of the valve 45 are to a greater or less extent condensed in passing through this lower strata of fuel, and any gases or vapors remaining incondensed are discharged out through the pipe 18 by the forceful discharge of fuel to the carbureter. The relatively colder liquid from the bottom of the supplemental chamber upon entering the pumping chamber displaces and condenses the vapors tending to remain therein. The result is a relatively high suction created in the supplemental chamber 42 for drawing the fuel through the intake pipe 16. The pumping chamber 15 is primed by the liquid from the chamber 42 and is therefore able to start pumping whenever heat is supplied.

The embodiment shown in Figure 6 segregates the body of liquid vaporized in the pumping chamber from the body of fuel being pumped, and is therefore admirably adapted for using water or any other desired liquid, as the motive fluid for pumping the fuel. In this form the fuel enters through the intake pipe 16 which opens into the supplemental chamber 42 at an intermediate point. The outlet occurs from the top of the supplemental chamber through the pipe 18 as in the previous embodiment. The pumping chamber 15 has inlet communication through the pipe 43 extending downwardly from the bottom of the chamber 42, and has outlet communication with a lower chamber 49. The bottom of this latter chamber communicates through a pipe 51 with the bottom of the supplemental chamber 42. Mounted in the supplemental chamber 42 below the level of the intake pipe 16 are two conical baffles 52 having central apertures 53. These baffles define trapping areas under their outer circumferences. The opening of the pipe 51 into the chamber 42 communicates with a deflecting pipe or channel 54, the end of which is arranged to discharge up into these trapping areas under the baffles. The pipe 43 extending from the top of the pumping chamber 15 also opens into the deflecting pipe or channel 54. The liquid discharged into the chamber 49 and pipe 51 under the expansion of the vapors in the upper part of the pumping chamber 15 enters the lower part of the supplemental chamber 42 and displaces fuel out of this latter chamber through the outlet pipe 18. The heated volume of liquid entering the chamber 42 ascends up into the trapping areas under the baffles 52 and, while effectively displacing the fuel from the upper part of the chamber 42, it does not mingle therewith. Similarly, any vapors entering the chamber 42 through the pipe 51, or vented through the pipe 43, are deflected by the deflecting means 54 so as to ascend into the trapping areas under the baffles 52 where they are condensed and precipitated into the volume of liquid below these baffles. It will be seen that by the foregoing action of segregating the motive fluid operating in the pumping chamber 15 from the fuel circulating through the upper part of the chamber 42, water or any other desirable liquid may be employed in the pumping chamber for producing the pumping impulses. And yet, because of direct contact between the two liquids, the rejected heat of the pumping device is transmitted to the liquid fuel where it becomes useful, as heretofore explained, in assisting in vaporizing and mixing the liquid fuel with air. When using the fuel itself as the motive fluid, this segregative feature retains the heated liquid in the pumping mechanism and insures the discharge of a comparatively cool volume of fuel from the mechanism so that more rapid pumping of the device results.

Figure 7:
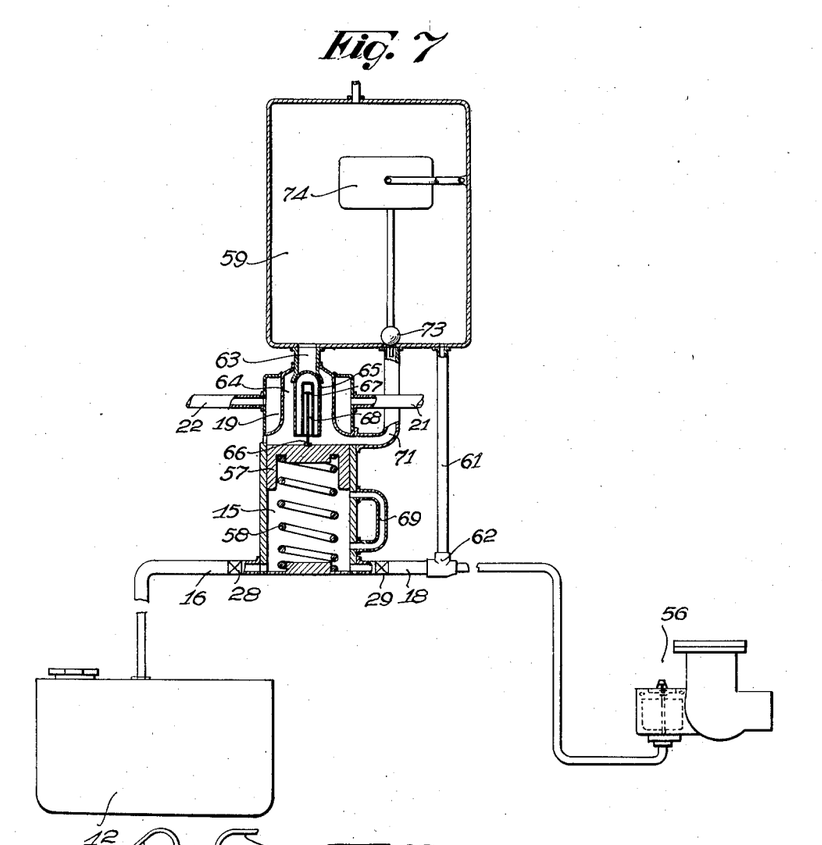
Fig. 7 illustrates in digrammatic section a form wherein the pumping chamber has a movable wall.

In Figure 7 I have shown a further embodiment wherein the pumping chamber employs a movable piston, and wherein there is a reservoir chamber for controlling the action of the pumping mechanism. In this form the pumping chamber 15 has the usual communication with the inlet and outlet pipes 16 and 18 which open into the lower part of the pumping chamber and are controlled by the usual check valves 28 and 29, respectively. The outlet pipe 18 is shown as feeding fuel to the float chamber of a carbureter 56. The displacement of the fuel in the pumping chamber 15 is produced by the reciprocation of a piston 57 which is normally urged to the top of its stroke by a compression spring 58. Superposed above the pumping chamber 15 is a reservoir chamber 59. This chamber receives fuel through a pipe 61 which extends downwardly from the bottom of the chamber and communicates with the outlet pipe 18 at the T connection 62. The chamber 59 feeds fuel through the pipe 63 into the upper reduced portion 64 of the pumping chamber 15. The heating jacket 19 encircles this reduced chamber portion 64 for heating only the fuel contained in this part of the chamber. A float 65 is arranged to control the port opening at the lower end of the pipe 63, this float having a lost motion connection with the pumping piston 57 through a rod 66 having a collar 67 at its upper end engaging in a bore 68 in the float. The chamber 15 has a shunt pipe 69 communicating with the chamber 15 at two different levels spaced apart a distance corresponding to the height of the piston 57. The upper chamber portion 64 has a by-pass communication with the reservoir chamber 59 around the valve 65. This by-pass connection consists of a pipe 71 opening into the chamber portion 64 at a point adjacent the bottom thereof, and opening into the bottom of the reservoir chamber 59. The outlet of this by-pass into the chamber 59 is controlled by a valve 73 which is responsive to the rise and fall of a float 74.

Assuming the fuel to be at such level in the chamber 59 as to hold the valve 73 closed, it will be apparent that the generation of a vapor pressure in the chamber portion 64 will push the piston 57 downwardly and expel the fuel below the piston out through the outlet pipe 18. The float 65 may be constructed to recede from the pipe 63 with the falling of the fuel level so as to vent the vapor up into the chamber 59. In the embodiment shown, however, the float 65 is sufficiently light to be held on its seat by the pressure generated in the chamber 64 despite the lowering of the fuel level. As a consequence, the piston 57 is compelled to make a full stroke before the valve 65 is pulled off its seat by the lost motion connection 66—68. With the venting of the vapor consequent upon releasing the valve, the piston 57 is pushed upwardly by the spring 58, thereby making an intake stroke in the chamber 15. The shunt pipe 69 may be inserted as a precautionary measure, or may be employed to perform the function of venting the upper chamber area above the piston 57. In the first instance, the pipe 69 is so located that if the descent of the piston 57 should fail to unseat the valve 65, the continued motion of the piston would expose the upper end of the shunt pipe to the upper chamber area and allow the pressure to be shunted around the piston, into the lower chamber area. It will be apparent from the above action that the shunt pipe may be arranged to normally function as a discharge connection for relieving the motive pressure when the piston has completed its downward stroke. It will be observed that any fuel which the carbureter 56 is incapable of receiving, is directed up into the reservoir chamber 59. When the level therein rises above a predetermined point, the raising of the float 74 unseats the valve 73 and opens the by-pass 71. Thereafter, any vapors generated in the chamber portion 64 expand outwardly through the by-pass 71 with the result that no pumping pressure can be generated until the fuel level in the reservoir chamber 59 falls and allows the valve 73 to seat itself. Instead of having the float 74 control the by-pass 71 this float may be arranged to control the flow of exhaust gases through the jacket 19, as by connecting it with a suitable valve interposed in the exhaust line 21.

Figure 8:
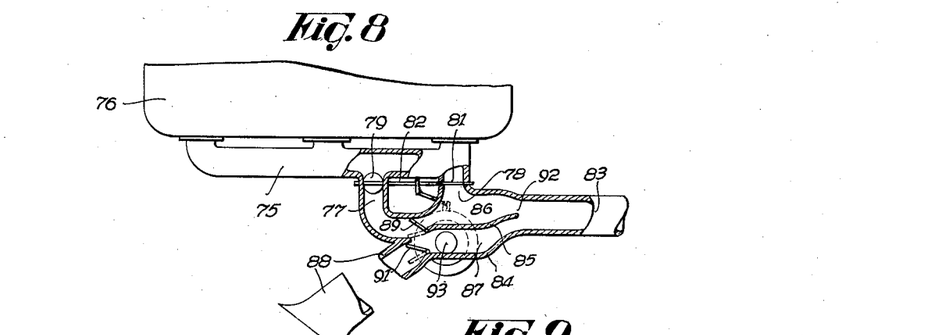
Fig. 8 is a plan view partly in section of another embodiment incorporating means for controlling the application of heat to the fuel pumping mechanism.
Figure 9:
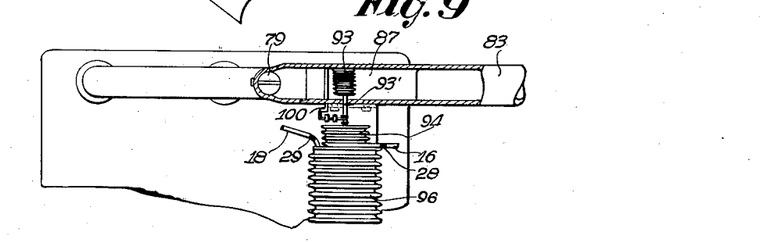
Fig. 9 is a front view of the same.
Figure 10:
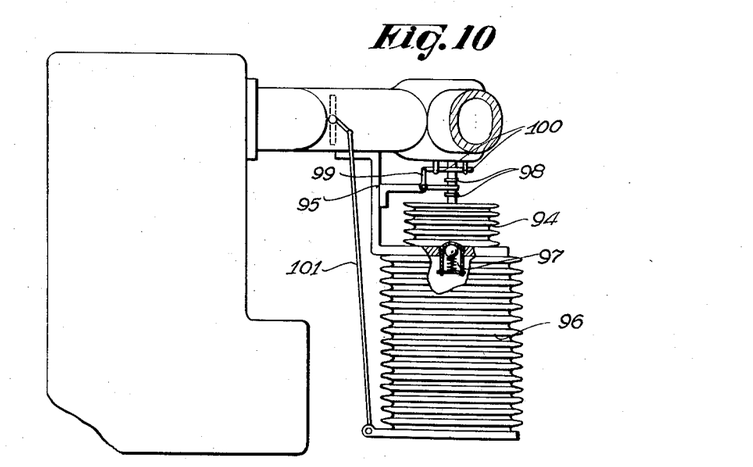
Fig. 10 is an end view of the same.

In Figures 8, 9 and 10, I have shown a modified arrangement wherein the fuel is not subjected to the heat of the exhaust gases, but a thermal member adapted for alternate expansion and contraction is arranged to absorb the heat of the exhaust gases and perform the pumping function. In the illustrative form shown 75 represents a particular design of exhaust manifold mounted on the engine block 76. The manifold 75 has two outlet channels 77 and 78 which are controlled by throttles 79 and 81 on a common throttle shaft 82. Both exhaust channels 77 and 78 discharge into the exhaust conduit 83. This conduit is enlarged at 84 to receive a transverse partition wall 85 which divides this portion of the conduit into an inner passageway 86 and an outer passageway 87. The outer passageway is arranged to alternately receive currents of exhaust gases and then relatively cool air therethrough, and for circulating the relatively cool air through this passageway, the manifold has an extending air horn 88 communicating with the forward end of the passageway. For controlling the circulation of the exhaust gases and cool air through the passageway 87 there are provided two swinging dampers 89 and 91 which are arranged to operate together. The partition 85 is terminated short of the outer wall of the exhaust channel 77 to permit the damper 89 to direct the exhaust gases from this channel out through the passageway 87 when the damper is in its inner position. The inner passageway 86 is contracted at the point 92 to form an ejector nozzle for aspirating or inducing a flow of relatively cool air through the outer passageway 87 when the two dampers 89 and 91 are in their outer positions.

The thermally responsive element preferably consists of a hermetically sealed sylphon 93 which is secured to the upper wall of the outer passageway 87. This sylphon may contain a gas, and, if desired, may also contain a suitable liquid for creating a greater pressure in the sylphon. The stem 93' of this power sylphon extends downwardly through the lower wall of the passageway 87 and connects with the upper end of a pumping sylphon 94. The bottom of this latter sylphon is secured to a bracket 95 which is rigidly mounted on the exhaust manifold or engine block. Depending from the under side of the bracket 95 is a storage or reservoir sylphon 96 of sufficient capacity to receive a plurality of strokes of the pumping sylphon 94. Fuel is drawn into the pumping sylphon 94 through the usual fuel intake pipe 16 leading from the fuel supply tank, the customary check valve 28 being interposed in this pipe. The outlet from this pumping sylphon is through a downwardly opening check valve 97 in the horizontal plate of the bracket 95, through which the fuel is discharged into the storage sylphon 96. Leading from the upper end of the storage sylphon 96 is the usual outlet pipe 18 having its customary check valve 29. The stem 93' of the power sylphon has mounted thereon a pair of spaced collars 98 which are adapted to oscillate a bell crank lever 99. The upper arm of the bell crank lever 99 has connection through a suitable link with crank arms 100 for simultaneously swinging the dampers 89 and 91. A rod 101 has connection with the bottom of the storage sylphon 98 and at its upper end has pivotal connection with a suitable crank arm on the common manifold shaft 82.

In operation with the dampers 89 and 91 in the positions illustrated and the throttles 78 and 81 so disposed as to deflect all of the exhaust gases through the channel 77, it will be noted that the entire volume of exhaust gases will pass through the outer passageway 87, thereby subjecting the power sylphon 93 to a relatively high temperature. The resulting expansion of the sylphon imposes a power stroke upon the pumping sylphon 94 by expelling the fuel previously drawn into the sylphon down into the storage sylphon 96 through the check valve 97. The collars 98 are so spaced that the power sylphon substantially completes its expansion before the upper collar engages the horizontal arm of the bell crank lever 99. The continued expansion of the sylphon quickly throws the two dampers 89 and 91 into their outer positions through the mechanical connection established through the bell crank lever 99. With the dampers in this position, the exhaust gases are blocked from entering the outer passageway 87 and are deflected through the inner passageway 86 so as to exert a maximum ejector or aspirator effect at the nozzle point 92 for stimulating the circulation of relatively cool air through the horn 88 and passageway 87. This cool air quickly contracts the sylphon 93 and produces an up stroke of the pumping sylphon 94. Near the end of this upstroke, the lower collar 98 engages the horizontal arm of the bell crank lever 99 and swings the two dampers 89 and 91 into their inner positions for a repetition of the action above described. The fuel may have a gravity feed from the storage sylphon or the elasticity of the sylphon may be utilized for producing a pressure feed to the carburetor. When the storage reservoir accumulates a predetermined quantity of fuel or when a predetermined pressure is developed therein the expansion of the sylphon operates through the rod 101 to oscillate the throttle shaft 82 and close the throttle 79 and open throttle 81. This shunts all of the exhaust gases through the channel 78 where they are inaccessible to the outer passageway 87, with the result that the power sylphon 93 becomes inert until the throttles are again actuated by the contraction of the storage sylphon to direct exhaust gases through the channel 77.

Figure 11:
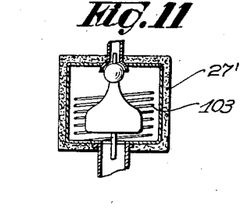
Fig. 11 is a sectional view of another modified construction.

It will be seen from the foregoing that all of the above embodiments have in common the method of feeding fuel by the conversion of heat energy into a fuel feeding pressure, either by the direct application of the heat energy to the fuel, or to a medium which translates the heat energy into fuel feeding pressure. The source of heat may be from the exhaust gases, from the cooling water in the cooling system, from an electrical heating coil, or from any other suitable source. An additional advantage residing in the use of the exhaust gases is the fact that the rate of pumping automatically increases or decreases with the speed of the engine under the varying volumes of exhaust gases discharged. In Fig. 11 a method of electrical heating is illustrated wherein the pumping chamber has mounted therein an electrical heating coil 103. The heat insulation 27' entirely surrounds the pumping chamber in this embodiment.

Figure 12:
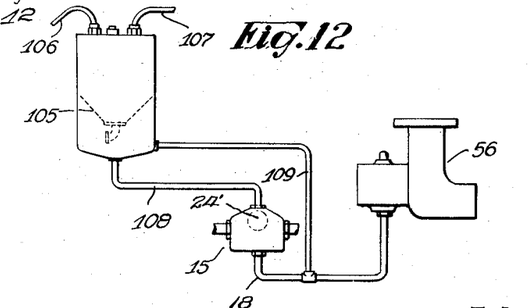
Fig. 12 illustrates diagrammatically an embodiment designed particularly to heat the fuel.

In Figure 12 the pumping chamber is used essentially to heat the fuel, this being of particular advantage with the heavier fuels and in cold weather. The action of this arrangement is to intermittently heat small increments of fuel and create a circulation of heated fuel from which the carbureter can always draw. The pumping or heating chamber 15 is here shown as being fed from a superposed tank 105, which is either a typical vacuum feed tank, or a supplementary float controlled tank into which the fuel supply from the main tank discharges. The fuel supply line from the main tank is illustrated at 106, and where the tank is a vacuum feed device a pipe 107 connects with the intake manifold. The fuel is discharged from the bottom of this tank into the top of the chamber 15 through a pipe 108. The opening of this pipe into the chamber 15 is controlled by the float valve 24' and the chamber is heated by the usual exhaust jacket 19. Discharge occurs through a pipe 18 leading to the carbureter 56. Interposed in this discharge pipe is a T connection from which branches a pipe 109 leading back to the bottom of the superposed tank 105. In installations employing a vacuum feed tank both pipes 108 and 109 should open into the lower atmospheric chamber which, in the conventional arrangement is adapted to feed by gravity to the carbureter.

This insures that any return circulation up through the pipe 108 will not disturb the vacuum feed operation in the other portion of the tank. In operation the generation of a vapor pressure in the chamber 15 will expel a small volume of highly heated fuel into the discharge pipe 18. Such quantity of this charge as is not taken into the carbureter float chamber is circulated up through the pipe 109 into the tank 105. The pumping capacity of the chamber 15 is preferably designed to pump a slightly larger volume of fuel than the carbureter will use at that particular engine speed. When the float 24′ falls away from the inlet port the vapor is practically all condensed by mingling with the fuel entering through the pipe 108. The intermittent pumping impulses act through that volume of fuel which is not taken into the carbureter to create a step by step circulation through the chamber 15, the bottom of the tank 105 and the connecting pipes 108 and 109. The circulating volume of fuel soon reaches a relatively high temperature, which can be regulated by proportioning the relative capacities of the pumping chamber to the entire circuit, or by controlling the flow of exhaust gases through the jacket 19. This circulating volume of heated fuel is always instantly available as a source of supply for the carbureter, which is thus given a fuel in ideal condition for immediate vaporization. In normal operation, the carbureter will continuously draw a small quantity of fuel from the circuit, and it will be noted that this fuel is drawn from the hottest point in the circuit adjacent the outlet from the chamber 15. As noted above, the rate of heating is automatically controlled by the engine speed through the variation in volume and heat of the exhaust gases.

I now wish to call attention to the fact that there is a peculiar and advantageous relation existing in the combination of elements which form the subject matter of this invention.

The heat operated pump is exposed to the exhaust gases of the engine, primarily to secure the necessary heat energy for operation of the pump, but there is a farther and highly important relation, namely, that the amount of heat rejected by the engine is a good criterion of the amount of fuel burned by the engine, as is well known to those skilled in the art. Hence, the more fuel the engine requires, the more rapid will be the pumping, and vice versa. The pumping is not responsive to speed alone, nor to position of throttle alone, but instead, is more nearly responsive to work done.

When the engine stops, the pumping likewise stops, and when the engine starts, the pumping starts; and at all intermediate points the pumping is automatically responsive to the fuel consumed. This is broadly new.

I am aware that certain of the elements of the combination are old, and I do not lay claim to them.

It twill be obvious that various changes may be made in the general embodiments hereinbefore described without departing from the essence of the invention, as set forth in the appended claims.

I claim:

1. In combination, an internal combustion engine, a carbureter therefor, a fuel supply tank, a fuel pumping chamber having an inlet communicating with said supply tank and an outlet communicating with said carbureter, a jacket associated with said chamber for receiving the exhaust gases of said engine, and a level responsive valve for said chamber operating to trap the liquid vapors in said chamber and create pumping pulsations for feeding the fuel to said carbureter.

2. In a fuel feed system, a source of fuel supply, a fuel burning device, a pumping chamber connecting the two, means for heating the fuel in said chamber to generate a vapor, and a valve normally trapping said vapor, said valve being opened by the expulsion of fuel from said chamber to vent said vapor.

3. In a fuel feed system, a source of fuel supply, a fuel burning device, a pumping chamber connecting the two, means for heating the fuel in said chamber to generate a vapor, and means responsive to the level in said chamber for controlling the venting of said vapor.

4. In a fuel feed system, a source of fuel supply, a fuel burning device, a pumping chamber connecting the two, means for heating the fuel in said chamber to generate a vapor, and means responsive to the fuel level in said chamber for controlling the admission of fuel thereto, the pressure of said vapor expelling the fuel from said chamber.

5. In a fuel feed system, a source of fuel supply, a fuel burning device, a pumping chamber connecting the two, means for heating the fuel in said chamber to generate a vapor, and a float controlled valve for venting the vapor from said chamber and for admitting a fresh charge of fuel thereto 6. In a fuel feed system having a source of fuel supply and a fuel burning device, the combination of pumping mechanism comprising a pumping chamber, a supplementary chamber above said pumping chamber and feeding thereto, said supplementary chamber being adapted to draw from said source of supply, means for heating the fuel in said pumping chamber, the vapor therefrom discharging the fuel to the point of consumption, and means responsive to the level in said pumping chamber for controlling the admission of fuel from said supplementary chamber.

7. In combination with an internal combustion engine having a carburetor and an exhaust pipe, a fuel tank, a reservoir for feeding the carburetor, a heat operated pumping device connected between the tank and the reservoir, a connection from the exhaust pipe to said pumping device to convey a portion of the exhaust gases from the engine to said pumping device, and an overflow for returning the excess fuel to the tank from the reservoir.

In witness whereof, I hereunto subscribe my name this 29th day of October, 1921.

JOHN A. DIENNER.